R. M. PATTERSON.
REFRIGERATOR DRIP PAN.
APPLICATION FILED OCT. 9, 1911.
1,063,724.  Patented June 3, 1913.
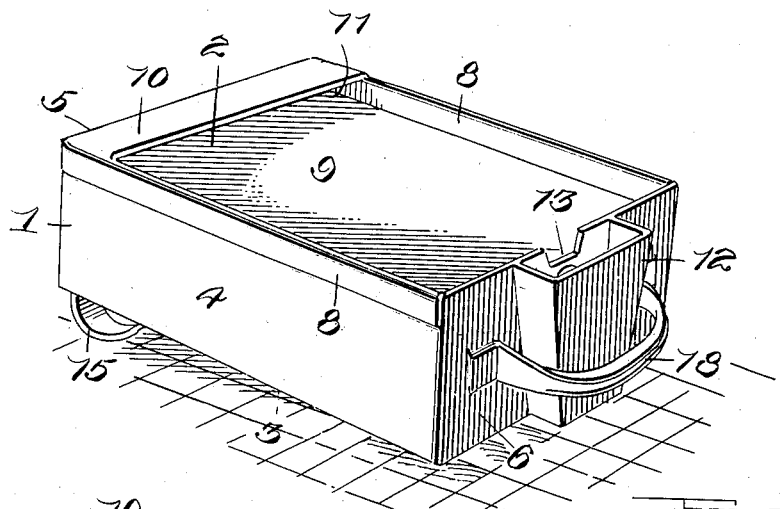
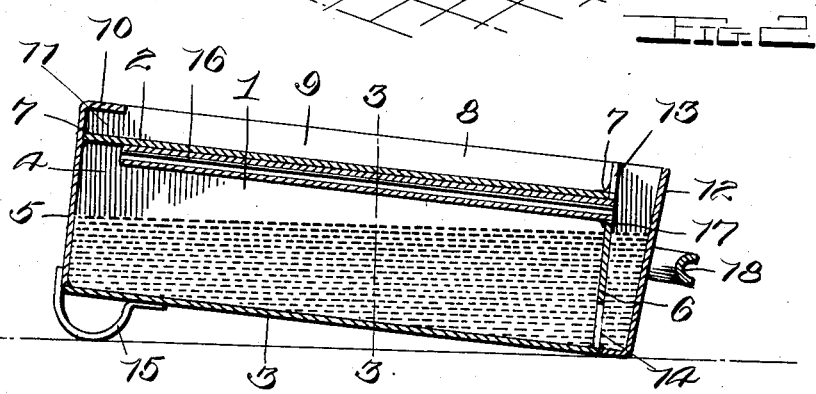
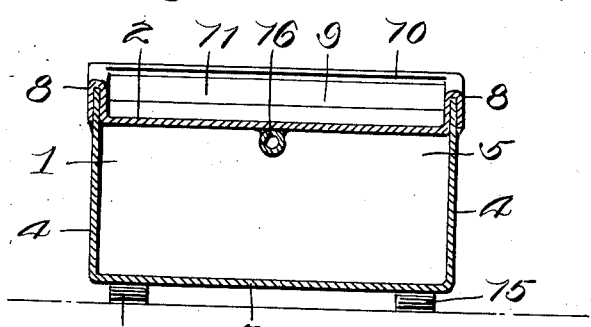
Inventor
R. M. Patterson.
Witnesses
By
Attorney

UNITED STATES PATENT OFFICE.

RANDALL M. PATTERSON, OF WACO, TEXAS.

REFRIGERATOR DRIP-PAN.

1,063,724.   Specification of Letters Patent.   Patented June 3, 1913.

Application filed October 9, 1911. Serial No. 653,616.

*To all whom it may concern:*

Be it known that I, RANDALL M. PATTERSON, a citizen of the United States, residing at Waco, in the county of McLennan and State of Texas, have invented certain new and useful Improvements in Refrigerator Drip-Pans; and I do hereby declare the following to be a full, clear, and exact description of the invention, such as will enable others skilled in the art to which it appertains to make and use the same.

This invention relates to improvements in refrigerator drip pans.

An object of this invention is to provide a drip pan which is closed thereby preventing any water from being spilled.

Another object of this invention is the provision of a drip pan which shall be closed and formed with an open pan in the top thereof to receive the drippings and means for conveying the drippings from the open pan into the closed pan.

With these and other objects in view my invention resides in the combination and formation of parts which shall be hereinafter more fully described, claimed and illustrated in the accompanying drawing, in which:

Figure 1 is a perspective view of my improved refrigerator drip pan; Fig. 2 is a longitudinal section through the same; Fig. 3 is a transverse section taken on the line 3—3 of Fig. 2.

Referring more particularly to the drawings, the numeral 1 indicates generally my improved refrigerator drip pan. The pan is formed of a top 2, bottom 3, sides 4, a rear or upper end 5 and a front or lower end 6. The bottom and sides are formed of one piece of metal bent to the proper shape and the ends are soldered thereto. The top 2 is secured to the receptacle slightly below the top edges thereof, being soldered to the ends as at 7 and the sides thereof being formed with vertical double flanges 8, which are soldered to the sides of the pan thereby forming an open pan 9 upon which the water drops as it leaves the refrigerator. The rear end 5 of the receptacle is formed with a flange 10 which is bent parallel with the top and soldered to the vertical flanges thereof, forming a trough 11 at the rear of the open pan 9 to prevent the overflow of water on the top of the pan when it is carried by the handle and the cover 2 is in vertical position.

An emptying and filling spout 12 is formed at the front of the pan. This spout is closed at the bottom and open at the top and a notch 13 formed in the flange at the front end of the receptacle allows the water to flow into the spout from which it passes into the closed pan through an aperture 14 formed in the pan adjacent the bottom of the spout.

Legs or feet 15 are secured to the bottom of the pan at the rear end thereof inclining the pan so that the water will tend to run immediately to the filling spout and thence into the closed pan. These legs or feet also allow air to circulate under the pan when in use, thus preventing the floor or carpet from becoming and remaining wet.

To facilitate the emptying of the pan a tube 16 is soldered or otherwise secured in an aperture 17 in the pan under the notch 13. This tube extends nearly to the rear of the pan and when the water is emptied through the aperture 14 into the spout 12 air will pass into the pan through the tube 16 to take the place of the water which may flow steadily out of the aperture 14.

A handle 18 is secured to the pan at the lower end thereof whereby the pan may be carried in a vertical position without danger of spilling the water. Should there be any water in the open pan when it is removed for emptying, the trough 11 will prevent it from being spilled.

It will be seen from the above description that I have provided a drip pan which will prevent any water from becoming spilled and which provides all of the necessary requirements of such a device.

Having fully described my invention, what I desire to secure by Letters Patent and claim is:

1. A closed drip pan, comprising a top formed with vertical flanges, a trough formed on said top adapted to retain water on said top when carried in a vertical position, a spout formed on one end of said pan, and means to convey the water from said top through the spout and into the pan.

2. A closed drip pan, comprising a top, vertical double flanges formed on said top, a trough formed on said top adapted to retain the water on the top when the pan is carried vertically, a spout formed on one end of said pan, said spout being closed at the bottom and open at the top, and means for conveying the water from the top of the pan into the closed portion thereof.

3. A closed drip pan, a top having double vertical flanges formed at the sides thereof, said top secured into the pan slightly below the top edges thereof, a spout formed on one end of said pan, a notch formed in the upper end of said pan adjacent the spout, an aperture formed in said pan at the front end thereof and a tube secured in said spout, said tube extending nearly the length of the pan.

In testimony whereof I affix my signature in presence of two witnesses.

RANDALL M. PATTERSON.

Witnesses:
E. E. COMMACK,
C. B. ELDRIDGE.